Patented June 20, 1933

1,914,870

UNITED STATES PATENT OFFICE

NORMAN D. SCOTT, OF METUCHEN, AND PAUL E. WESTON, OF SEWAREN, NEW JERSEY, ASSIGNORS, BY MESNE ASSIGNMENTS, TO E. I. DU PONT DE NEMOURS AND COMPANY, A CORPORATION OF DELAWARE

METHOD OF HYDROGENATION

No Drawing. Application filed February 25, 1930. Serial No. 431,329.

This invention relates to hydrogenation in the liquid phase, and has for its object the provision of a soluble catalyst for such reaction.

Prior to our invention, no soluble catalyst was known for hydrogenation of organic compounds. We have discovered that iodine will act as such catalyst or hydrogen carrier. In the processes of our invention, it is only necessary to mix the iodine with water in a suitable pressure apparatus, bring the compound to be hydrogenated into contact with this mixture, or dissolve it therein, and to heat the mixture while supplying hydrogen under pressure. Agitation of the reactants will cause a more thorough mixing, and speed up the reduction.

Due to the fact that the probable course of the reaction is through the intermediate formation of hydrogen iodide, we have fuond that the start of the reduction may be considerably speeded up if, instead of iodine, a solution of iodine in hydrogen iodide, or even hydrogen iodide alone, be used as the starting material.

We have thus been able to reduce benzophenone to diphenylmethane, maleic acid to succinic acid, naphthalene to tetra-hydronaphthalene and hexahydronaphthalene, oleic acid to stearic acid, benzaldehyde to toluene, benzhydrol to diphenylmethane, and the like.

These reductions are illustrative of typical reductions, to wit;

1. Aldehyde or ketone to a hydrocarbon.
2. Unsaturated linkage to saturated:
    (a) Unsaturated acids
    (b) Unsaturated hydrocarbons
3. Alcohols to hydrocarbons.

We thus consider this method of reduction is applicable to organic compounds capable of taking up hydrogen by addition or substitution.

In order to secure adequate speed of reduction the reaction mixture is heated, the higher the temperature the greater the speed. The limits of temperature are thus not exactly fixed. The temperature must be high enough to secure rapid reduction of iodine in the solution so as to avoid the accumulation of any considerable amount of free iodine which might cause iodation of the organic compound, polymerization, or other undesired reaction. The amount of free iodine which can be tolerated depends on the nature of the compound being reduced; if the compound reacts easily with iodine such as by oxidation, substitution, polymerization and the like any considerable amount of free iodine must be avoided.

It is therefore obvious that as high a temperature as is practical will be the most satisfactory. The upper limit of temperature for the reaction depends on the stability of the compounds concerned. The temperature must not be so high as to cause thermal decompositions of the compound being reduced or of the reduction product; it may be that too high a temperature will cause polymerization or other undesired interaction. Thus, for example, while benzaldehyde can be reduced to toluene at an appropriate temperature, if too high a temperature be used the benzaldehyde would polymerize. Further, compounds such as stearic acid might rearrange to form paraffins; other compounds would carbonize at too high a temperature and others would decompose completely.

Thus, while we have given certain specific temperatures in regard to specific compounds, other temperatures might be employed therewith. The optimum temperature, however, for the hydrogenation of any particular compound must be determined by experiment and consideration of such properties of the compound as may be described in the literature. In general we prefer not to go below 100° C. since the rate of reduction below that temperature would be too slow, and there is a danger of considerable amounts of free iodine remaining unreduced. We have found that in general the most satisfactory range for reduction is between about 150° C. to 250° C.

These reductions proceed at low pressures but we have found it advisable to use pressures above atmospheric to increase the rate of reaction. The pressures used may be moderate, a pressure of 200 pounds per square inch being sufficient for economic speeds of reaction; the reaction, however, proceeds more rapidly at higher pressures. Obviously, there is no practical advantage in, though no objection to, going to super pressures of 1000 pounds or over. We have used such high pressures at times for the purpose of securing as high rates of reaction as possible. In general our preferred range of pressure is from 600-800 pounds per square inch. We have found that the reaction proceeds with fair rapidity at 300 pounds per square inch.

The concentration of hydrogen iodide in the aqueous solution (i. e. the concentration of iodine used at the start) will depend on the ease of reduction of the organic compound employed. We have found that the rate of reduction of the organic compound in general increases with the concentration of iodine at the start. For example, using benzophenone and hydriodic acid in the molar ratio 2:1, but in one case having the HI in a 57% aqueous solution, and in the second case having the same amount of HI in a 29% aqueous solution, the reduction is less than half as fast in the dilute solution; in the dilute solution the reaction was 31% complete in 3½ hours at 180° C., and 1000 pounds pressure, whereas in the concentrated solution it was 86% complete under the same condition.

Although the rate is thus dependent on the concentration, we have found that the rate changes very little with a change in the molar ratio of the organic compound HI, thus, for example, in the case of benzophenone using enough 57% hydriodic acid to give in one case a ratio by weight of benzophenone to HI of 9.1 to 11, and in the second case a ratio of 9.1 to 5.5, the rate of reduction was very nearly the same. These interrelations have also been found in the case of other organic compounds.

The following examples will illustrate the process of our invention.

*Example 1.*—9 parts by weight of benzophenone, 2.7 parts by weight of iodine crystals, and 2.7 parts by weight of water in a glass vessel enclosed in a steel pressure sustaining bomb heated to 180° C. with hydrogen supplied at a pressure of 600 pounds per square inch. This mixture was agitated for 4 hours, after which it was found that 90% of benzophenone had been reduced to diphenylmethane. The aqueous solution remaining was colorless, and the analysis showed that the total quantity of iodine used at the start was left in solution as hydrogen iodide. A blank, i. e. no $I_2$, gave no hydrogenation.

*Example 2.*—A run similar to Example 1 was made, in which there was substituted for the iodine and water 5 parts by weight of an aqueous solution of hydrogen iodide (sp. g. 1.7, 57% HI).

*Example 3.*—23 parts by weight of maleic acid were placed in contact with 22 parts by weight of hydrogen iodide solution (sp. g. 1.7) in a glass vessel in a pressure bomb, and agitated while supplying hydrogen at a pressure of 1300 pounds per square inch, and with heating of the mixture to 180° C., 60% of the maleic acid had been converted to succinic acid in a three hour period.

*Example 4.*—26 parts by weight of naphthalene were agitated with 11 parts by weight of hydrogen iodide as in Example 3, resulting in 78% conversion to tetrahydronaphthalene in a period of 11 hours.

*Example 5.*—56 grams of oleic acid were placed in a tantalum lined steel pressure bomb in contact with 8.9 grams of hydriodic acid solution having a specific gravity of 1.7 (57%). This mixture was subjected to the mixture of hydrogen for 20 hours at a temperature of 220° C., and at a pressure of 20 pounds per square inch. At the end of this period it was found that 90% of the unsaturated acid had been reduced to stearic acid.

We claim:

1. Method of hydrogenating organic compounds, which comprises agitating said compound in contact with an aqueous solution containing a substance of the group consisting of iodine and hydrogen iodide while supplying hydrogen thereto at temperatures between 100° C. and 250° C.

2. Method of hydrogenating organic compounds, which comprises agitating said compound in contact with an aqueous solution containing a substance of the group consisting of iodine and hydrogen iodide while heating the mixture and supplying hydrogen thereto at an elevated pressure.

3. Method of hydrogenating organic compounds, which comprises agitating said compound in contact with an aqueous solution containing a substance of the group consisting of iodine and hydrogen iodide while heating the mixture to a temperature above 100° C. and supplying hydrogen thereto at a pressure of above approximately 200 pounds per square inch.

4. Method of hydrogenating organic compounds, which comprises agitating said compound in contact with an aqueous solution containing a substance of the group consisting of iodine and hydrogen iodide while heating the mixture to a temperature between about 150° C. and 250° C. and supplying hydrogen thereto at a pressure above about 200 pounds per square inch.

5. Method of hydrogenating organic compounds, which comprises agitating said compound in contact with an aqueous solution containing a substance of the group consisting of iodine and hydrogen iodide while heating the mixture to a temperature between about 150° C. and 250° C. and supplying hydrogen thereto at a pressure of about 300 pounds per square inch.

6. Method of hydrogenating organic compounds, which comprises agitating said compound in contact with a 57% aqueous solution of hydrogen iodide while heating the mixture and supplying hydrogen thereto at an elevated pressure.

7. Method of hydrogenating organic compounds, which comprises agitating said compound in contact with a 57% aqueous solution of hydrogen iodide while heating the mixture to between about 150° C. and 250° C. while supplying hydrogen thereto at a pressure above about 200 pounds per square inch.

8. Method of hydrogenating organic compounds, which comprises agitating said compound in contact with a 57% aqueous solution of hydrogen iodide while heating the mixture to between about 150° C. and 250° C. while supplying hydrogen thereto at a pressure of about 300 pounds per square inch.

9. Method of hydrogenating organic compounds, which comprises agitating said compound in contact with an aqueous solution containing a substance of the group consisting of iodine and hydrogen iodide while heating the mixture to a temperature between about 150° C. and 250° C. and supplying hydrogen thereto at a pressure of 600 to 800 pounds per square inch.

Signed at Perth Amboy, in the county of Middlesex and State of New Jersey this 30th day of January A. D. 1930.

NORMAN D. SCOTT.
PAUL E. WESTON.